United States Patent [19]

Hamada

[11] Patent Number: 4,984,800
[45] Date of Patent: Jan. 15, 1991

[54] HEAD OF GOLF CLUB AND METHOD OF PRODUCING THE SAME

[75] Inventor: Jiro Hamada, Noda, Japan

[73] Assignee: Hamada Enterprise & Co., Ltd., Tokyo, Japan

[21] Appl. No.: 484,000

[22] Filed: Feb. 22, 1990

Related U.S. Application Data

[63] Continuation of Ser. No. 280,676, Dec. 6, 1988, abandoned.

[30] Foreign Application Priority Data

Sep. 30, 1988 [JP] Japan .................................. 63-246537

[51] Int. Cl.⁵ ............................................... A63B 53/04
[52] U.S. Cl. .................................... 273/173; 273/167 F; 273/DIG. 1; 273/DIG. 6; 273/DIG. 23; 264/241; 264/250
[58] Field of Search ............................ 273/167–175, 273/77 R, 77 A, DIG. 1, DIG. 5, DIG. 6, DIG. 23; 264/250, 254, 259, 255, 271.1, 248, 241

[56] References Cited

U.S. PATENT DOCUMENTS 3,303,255  3/1967  Bracey, Jr. ........................ 264/248
3,879,245  4/1975  Fetherston et al. ................ 156/245
4,545,580  10/1985  Tomita et al. .................... 273/167 R
4,614,627  9/1986  Curtis et al. ..................... 273/167 H

FOREIGN PATENT DOCUMENTS 635767  1/1988  Japan ............................. 273/167 R
986979  3/1965  United Kingdom ............. 273/167 F Primary Examiner—Benjamin Layno
Assistant Examiner—Sebastiano Passaniti

[57] ABSTRACT

This invention discloses a novel head of a golf club, especially of the type called "wood". The head includes a foamed core means therein which is firm with a light weight. The head also includes a face directly attached to the core means. The core means with the face is molded over with a shell. The inclusion of the core enables the head to be big with a light weight. The direct attachment of the face to the core means enables avoidance of deviation of the face relative to the core means over long use.

12 Claims, 2 Drawing Sheets

HEAD OF GOLF CLUB AND METHOD OF PRODUCING THE SAME

This is a continuation of co-pending application Ser. No. 280,676 filed Dec. 6, 1988, now abandoned.

TECHNICAL FIELD

This invention relates to a head of a golf club and a method of producing the same which is light with high durability although being relatively big.

BACKGROUND ART

It is well known that there are two kinds of golf clubs which are called "wood" and "iron". Of the two, a wood is said to be more difficult for beginners to precisely hit a ball with since a wood is usually faster in head speed on a hit than that of an iron. One solution proposed is to make a bigger head to extend its appropriate hitting area for the purpose of facilitating a correct hit with a wood. It should be noted that a bigger head is consequently accompanied by a heavier weight which increase the difficulty of hitting with a wood.

As has been known by those skilled in the art, there are two methods of producing a head of a wood, one is called "injection molding" in which a resin with carbon powder is injected into a die to form a head and the other is called "compression molding" in which stacked carbon sheets are compressed to form a whole. With either of these two methods, after molding the head, a plate-like face to hit a ball is attached to the leading side of the head.

Some heads are provided with a cavity therein in an attempt to avoid an increase in their weight in consequence of an increase in their volume. However, those heads with a cavity have a problem of shortage of durability because relatively high distortions of the heads during hits due to the existence of the cavity deteriorates the connection of the face to the head over long use.

DISCLOSURE OF THE INVENTION

It is an object of the present invention to provide a head of a wood club and a method of producing the same which is light with high durability although being relatively large.

The present invention involves a head of a golf club comprising a core of foamed material, a face attached to the core, a shell molded over the core with the face attached thereto, and a sole plate attached to a lower surface of the head.

The core material can be one of a variety of materials with carbon fibers added thereto such as an ABS resin, nylon, a polycarbonate or the like, the foamed form of which has properties of being light and firm. Therefore the inclusion of the core consisting of such a foamed material causes the reduction in the overall weight of the head and provides high durability for the head.

The direct attachment of the face to the core also causes a great improvement in durability regarding the face.

The face and the core may have means for retaining a constant juxtaposition with each other which enables precise attachment of the face at an angle to the core and thus eliminates a deviation of the face in relation to the core.

The face may be attached in advance with a sheet which is of the same material as the shell. Such a sheet helps adhesion of the face to the shell. This can also be done when the face is processed in advance to have coarseness on its periphery.

In another aspect the present invention provides a method of producing a head of a golf club. The method comprises the steps of molding foamed core, attaching a face to the core, molding a shell over the core with the face attached thereto, and attaching a sole plate to a lower surface of the head.

The sole plate may be directly attached to the core in advance of molding the shell.

BRIEF DESCRIPTION OF THE DRAWINGS

Embodiments of the invention will now be described, by way of example, with reference to the accompanying drawings in which.

BEST MODE FOR CARRYING OUT THE INVENTION

Figure 1:
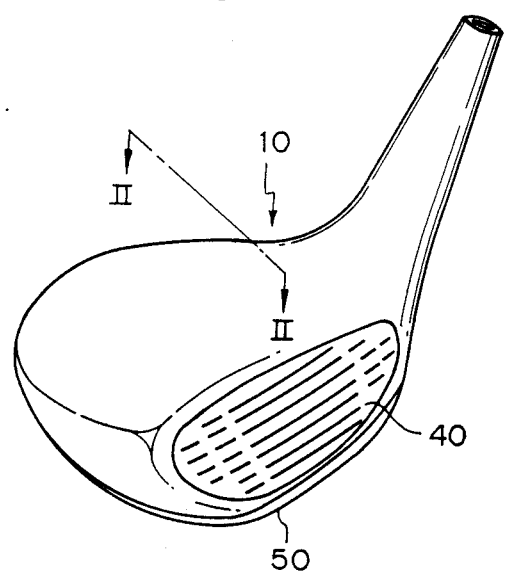
FIG. 1 is a perspective plan showing a head of a golf club in accordance with the present invention.

With reference to FIG. 1 showing a head of a golf club in accordance with the invention, the head 10 has an elongated circle like face 40. Please note that for convenience of explanation described below, the leading side and the trailing side of the head will respectively be designated as the front side and the rear side.

Figure 2:
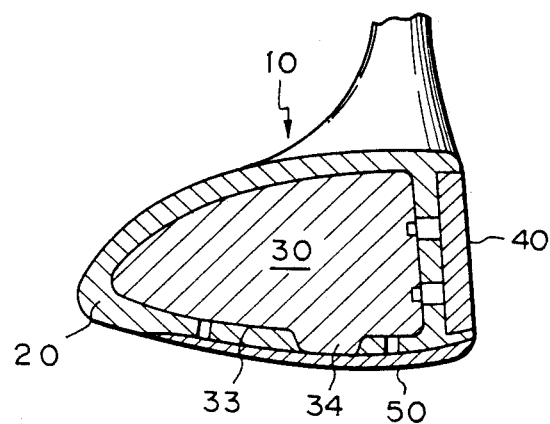
FIG. 2 is a cross-sectional plan taken along line II—II in FIG. 1.

With reference to FIG. 2 showing the inside of the head 10, the head has a shell 20 molded over a core 30 which is attached with a face 40. The head also has a metal sole plate 50 at the lower surface of the head which is attached to the core 30 by means of screws through the shell 20. Descriptions on each of the above elements will be provided below in detail.

The shell 20 is molded over the core 30 through a process of injection molding with a thickness of at least 5 mm (0.079") and consists of an ABS resin with carbon fibers added to a level of five percent.

Figure 3:
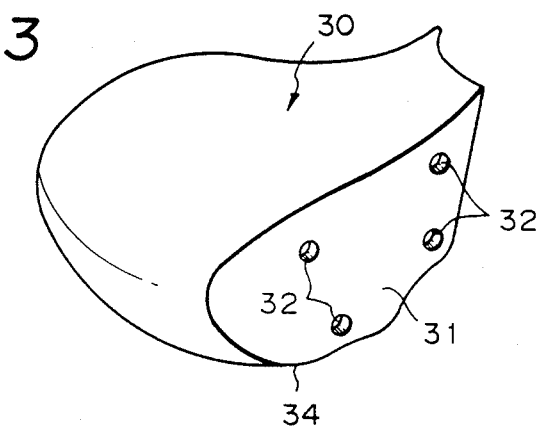
FIG. 3 is a perspective plan showing core means of the head.

As viewed in FIG. 3, the core 30 is so molded that it has a similar shape to the head 10 and has a flat front surface 31 with four round holes 32. The lower surface 33 of the core 30 has swollen positions 34 thereon as viewed in FIG. 2 which will abut against the inside of a die (not shown) during the molding of the shell 20 to support the core itself as described later. The lower surface 33 also has holes (not shown) for screw which are used for securing the sole plate 50 to the lower surface 33. The core 30 consists of a foamed ABS resin with the specific gravity of about 0.4 and has a trait in being light and firm which enables the production of a relatively big head with a relatively light weight. Carbon fibers may be added, if necessary, to increase firmness of the core. It should be noted that the material of the core is not limited to an ABS resin and could be a material such as nylon, carbon fibers or the like. It is preferable that the core 30 be molded as a solid as viewed in FIG. 2 from the point of view of firmness. However, the core can be hollow in the case that it is formed of a firm material such as that employed in this embodiment.

Figure 4A:
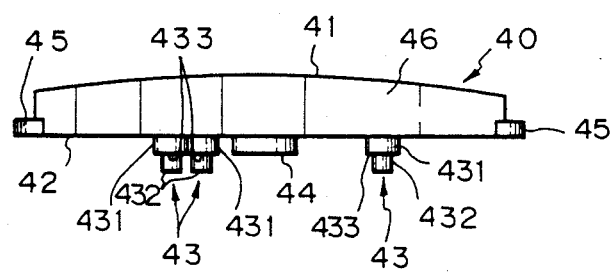
FIGS. 4(a) and 4(b) are respectively plans showing a face of the head.
Figure 4B:
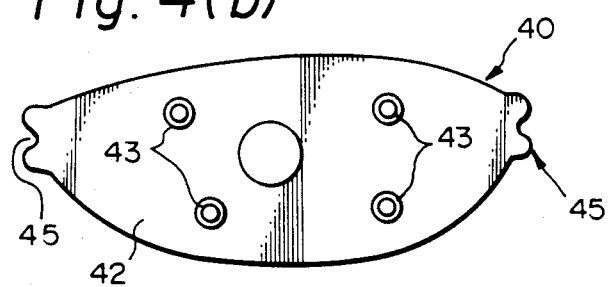

The face 40 consists of a molded vinyl ester resin with carbon fibers added at the rate of fifty percent in weight and with the thickness of at least 6 mm (0.709 "). As viewed in FIGS. 4(a) and 4(b), the face 40 has a substantially flat front surface 41 to be slammed against a ball and a flat rear surface 42 to face the core 30 with four stems 43 and a stem 44 projecting therefrom at right angles.

Each of the four stems 43 has an upright cylindrical pedestal 431 corresponding to one of the holes 32 of the core 30, and a cylindrical insert 432 coaxially integral with the top 433 of the pedestal 431 with a smaller diameter than that of the pedestal and as large in diameter as that of the holes 32.

There are integrated ears 45 projecting from the ends of the face 40 which will be held for the purpose of assistance to lay the face, that is, the core 30 with it held in place in a die during the molding of the shell 20. The face 40 may have coarseness over its periphery 46 either through process of sand-blasting or by means of sand-paper to help adhesion between the shell 20 and the periphery 46.

Figure 5:
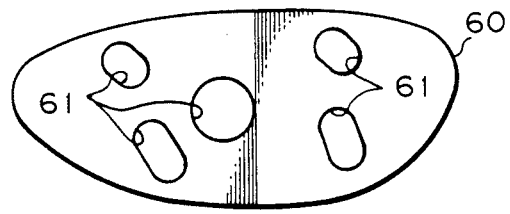
FIG. 5 is a plan showing a sheet employed as an adhesive material in the head.

FIG. 5 shows a sheet 60 with five openings 61, through which the four stems 43 and one stem 44 put to place itself into contact with the rear surface 42 of the face 40. The sheet 60 is made of the same material as that of the shell 20, e.g., an ABS resin and is attached to the rear surface 42 by adhesion in advance of molding the shell 20. The function of the sheet 60 will be described later in detail.

The sole plate 50 is exchangeable to adjust the weight of the head 10. The plate itself is the conventional one known to those skilled in the art and therefore a detailed description thereof is omitted here.

There will hereinafter be the descriptions of a method of producing the above described head 10.

The foamed core 30 is at first molded by the process known to those skilled in the art. The face 40 is also molded by a conventional process. Coarseness is produced over the periphery 46 of the face 40 by sand-blasting or sand-paper applied thereto.

The sheet 60 is then attached to the rear surface 42 of the face 40 with an epoxy resin.

The face 40 is then mounted on the core 30 in such a manner that the four inserts 432 of the stems 43 are respectively inserted into the corresponding holes 32 of the core 30 with an epoxy resin applied to the inserts and the top of the stem 44. It is important that all of the tops 433 of the pedestals 431 and the top of the stem 44 be abutted against the front surface 31 of the core 30. This assures that the face 40 is arranged parallel to the front surface 31 with the precisely constant distance which is defined by the height of the pedestals 431 and the stem 44. The importance in precise arrangement of the face 40 relative to the core 30 should be fully appreciated since even a very small deviation of the face in angle relative to the core can greatly affect a flight course of a ball. It should also be appreciated that the direct adhesion of the face 40 to the core 30 contributes strength of the head 10 against the impacts of hits, which results in the possibility that the occurrence of the deviation of the face over a long period of use is unlikely.

Then the core 30 with the face 40 is laid in a die and held firmly in the die in such a manner that the swollen portions 34 of the lower surface 33 are put on the inside of the die and the face 40 is retained by means of a vacuum holder (not shown) and the core 30 is urged toward the vacuum holder by a pin (not shown) stuck at the back of the core 30.

A very hot ABS resin with carbon fibers included at the level of five percent is then injected by means of high pressure into the die to form the shell 20 over the core 30. The hot resin causes the sheet 60 which is made of the same material as the injected resin to melt and to thereby help adhesion of the shell 20 to the rear surface 42 of the face 40. The coarse peripheral 46 of the face 40 also help adhesion of the shell 20 to the peripheral.

In the process of producing a conventional head, what often accounts for the lower yields is a movement of the core in the die during the molding of the shell 20 due to injection under high pressure. However, in the process according to this invention, since the core 30 is held firmly in the die in the above described manner, the movement of the core due to the injection pressure of the resin during the molding of the shell 20 is unlikely.

Finally the sole plate 50 is attached by screws to the lower surface of the head 10 after molding the shell 20. Alternatively, the sole plate 50 may be attached in advance of molding the shell 20. In this alternative process, the plate 50 has to be directly attached to the core 30 with a clearance therebetween. It should be noted that each of the alternatives has different merit and demerit. In the case that the attachment of the plate 50 follows the molding of the shell 20, it is possible for the plate to be exchanged later with another one which has a different weight while a little effort is required to attach the plate 50 to the lower surface of the head 10 without any clearance over their entire contacting surfaces, which sometimes leads to its distortion. On the other hand, in the case that the plate is attached in advance of molding the shell 20, it is possible for the plate to be naturally in contact with the lower surface of the head 10 without any clearance therebetween while the exchange of the plate is impossible.

What is claimed is:

1. A head of a golf club comprising: a core made of a foamed material;
 a face attached to said core; at least one of said core and said face having means for retaining a spaced apart constant juxtaposition with each other;
 a shell molded over said core with said face attached thereto; and
 a sole plate attached to a lower surface of the head.

2. A head in accordance with claim 1 further comprising a sheet attached by adhesion to the face at its surface facing said core, said sheet being of the same material as that of said shell.

3. A head in accordance with claim 2 wherein said face is provided with coarseness at its peripheral to help adhesion of the shell to the peripheral.

4. A head in accordance with claim 1 wherein said foamed core is made of a material selected from the group consisting of an ABS resin, a nylon, carbon fibers, or a polycarbonate.

5. A head in accordance with claim 4 wherein said foamed core is made of a material, selected form the group consisting of an ABS resin, a nylon, or a polycarbonate, with carbon fibers added to it.

6. A head in accordance with claim 1 wherein at least one of said core and said face are spaced apart in a constant juxtaposition from each other by stems projecting therefrom.

7. A head in accordance with claim 6 wherein said core and said face are spaced apart in a constant juxtaposition from each other by stems projecting from said face.

8. A head in accordance with claim 6 wherein at least one of said core and said face have recesses for receiving the free ends of said stems to position said face properly with respect to said core.

9. A head of a golf club comprising: a core made of a foamed material:
   a face attached to said core, at least one of said core and said face having means for retaining a spaced apart constant juxtaposition with each other;
   a shell molded over said core with said face attached thereto;
   a sheet attached by adhesion to said face at its surface facing said core to help adhesion of said shell to said face, said sheet being of the same material as that of said shell, said face provided with coarseness at its peripheral to help adhesion of said shell to the peripheral; and a sole plate attached to a lower surface of the head.

10. A method of producing a head of a golf club, said head comprising a core made of a foamed material, a face attached to said core, a shell molded over said core with said face attached thereto, and a sole plate attached to a lower surface of the head, said method including the steps of:
    molding said core foamed material;
    attaching said face in a constant juxtaposition to said core by stems projecting from said face;
    molding said shell over said core with said face attached thereto by stems projecting form said face to form the head; and attaching said sole to the lower surface of the head.

11. A method of producing a head of a golf club, said head comprising a core made of a foamed material, a face attached to said core, a shell molded over said core with said face attached thereto, and a sole plate attached to the lower surface of the head, said method including the steps of:
    molding said core of foamed material; attaching said face in a constant juxtaposition to said core by means of at least one of said core and said face having upright cylindrical pedestals projecting therefrom;
    molding said shell over said core to form the head with said face attached thereto by said upright cylindrical pedestals each having a top, and a free end located opposite said top end with said free end disposable in abutting relation on one of said face and said core, and a cylindrical insert coaxially integrated with said top of said pedestal, and attaching said sole plate to a lower surface of the head.

12. A method in accordance with claim 11 wherein said sole plate is directly attached to said core in advance of molding said shell.

* * * * *